United States Patent
Mosek

(10) Patent No.: US 7,636,825 B2
(45) Date of Patent: Dec. 22, 2009

(54) STORAGE DEVICE FOR DATA-SMUGGLING

(75) Inventor: Amir Mosek, Tel Aviv (IL)

(73) Assignee: SanDisk IL Ltd., Kfar Saba, IL (US)

( * ) Notice: Subject to any disclaimer, the term of this patent is extended or adjusted under 35 U.S.C. 154(b) by 348 days.

(21) Appl. No.: 11/772,207

(22) Filed: Jun. 30, 2007

(65) Prior Publication Data

US 2008/0276058 A1 Nov. 6, 2008

Related U.S. Application Data

(60) Provisional application No. 60/915,688, filed on May 3, 2007.

(51) Int. Cl.
*G06F 12/00* (2006.01)
(52) U.S. Cl. .................. 711/163; 711/103; 711/158; 711/165; 713/165; 726/27; 726/34
(58) Field of Classification Search .............. 711/163, 711/103, 158, 165; 713/165; 726/27, 34
See application file for complete search history.

(56) References Cited

U.S. PATENT DOCUMENTS

| 5,379,344 | A | * | 1/1995 | Larsson et al. ............ 380/251 |
| 5,579,522 | A | | 11/1996 | Christeson et al. ............ 713/2 |
| 5,991,858 | A | * | 11/1999 | Weinlander ................ 711/163 |
| 6,178,508 | B1 | * | 1/2001 | Kaufman ................... 713/183 |
| 6,397,333 | B1 | * | 5/2002 | Sohne et al. ............... 713/176 |
| 2006/0031632 | A1 | | 2/2006 | Moran et al. ............... 711/112 |
| 2007/0043667 | A1 | * | 2/2007 | Qawami et al. .............. 705/50 |
| 2007/0056042 | A1 | * | 3/2007 | Qawami et al. .............. 726/26 |

FOREIGN PATENT DOCUMENTS

| WO | WO 2005/013133 | 2/2005 |
| WO | WO 2006/066604 | 6/2006 |

* cited by examiner

*Primary Examiner*—Stephen C Elmore
(74) *Attorney, Agent, or Firm*—Martine Penilla & Gencarella, LLP

(57) ABSTRACT

A computer-readable storage medium having computer-readable code embodied thereon including: program code for restricting access, by a file system running on a host system, to a restricted area of a storage area of a storage device; and program code for enabling at least one application to access the restricted area via the file system. Preferably, the computer-readable code further includes: program code for enabling the storage device to copy data from a non-restricted area to the restricted area. Preferably, the computer-readable code further includes: program code for directing the storage device to route host-system read-requests, directed to addresses in the restricted area, to addresses in a non-restricted area. Preferably, the computer-readable code further includes: program code for applying access commands of the host system to restricted data residing in the restricted area when the host system requests access to non-restricted data addressed to a non-restricted area.

9 Claims, 11 Drawing Sheets

"COPY-DELETE" MODE

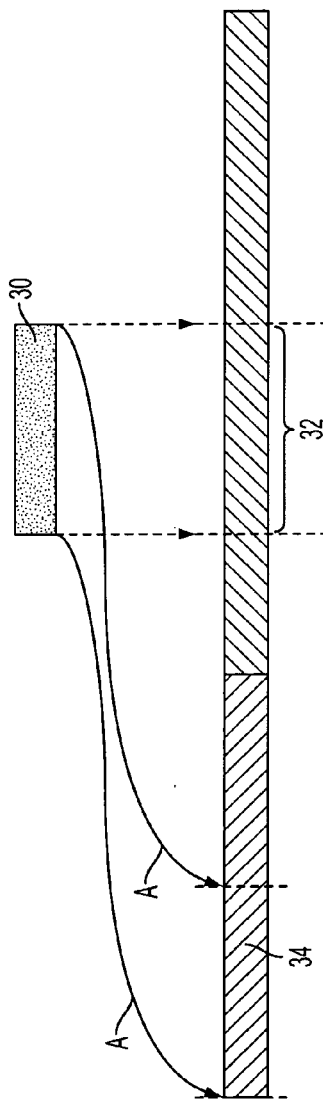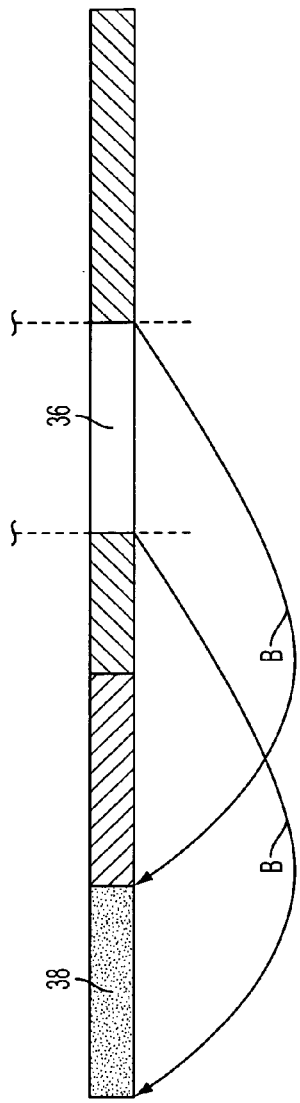

"MAP-OUT" MODE

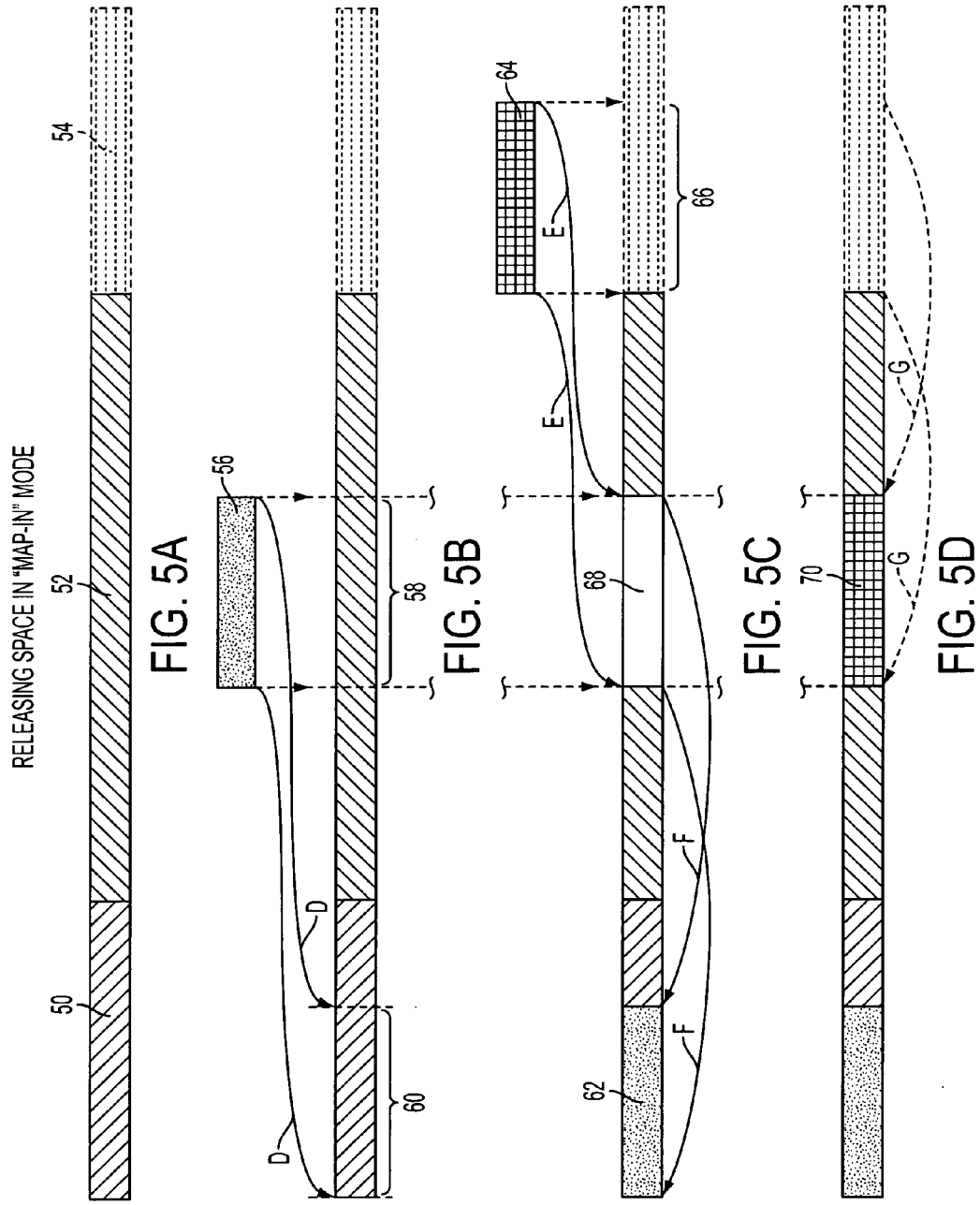

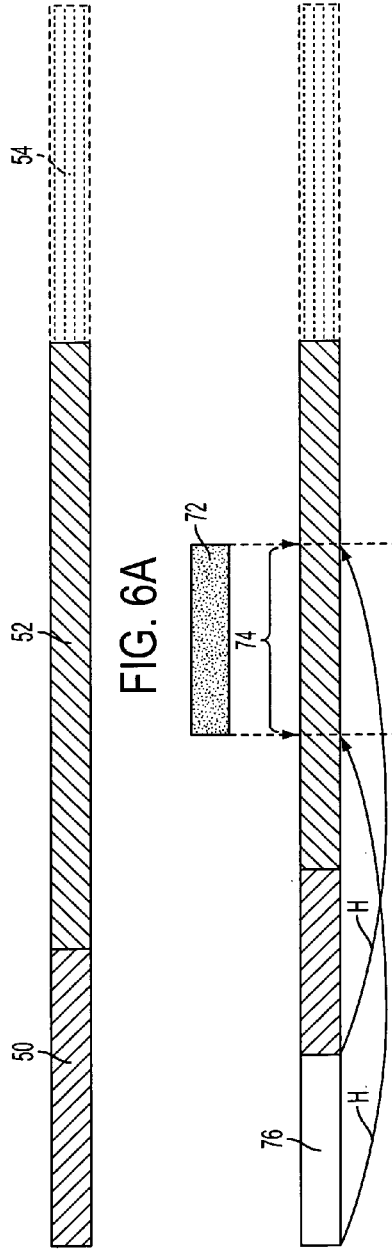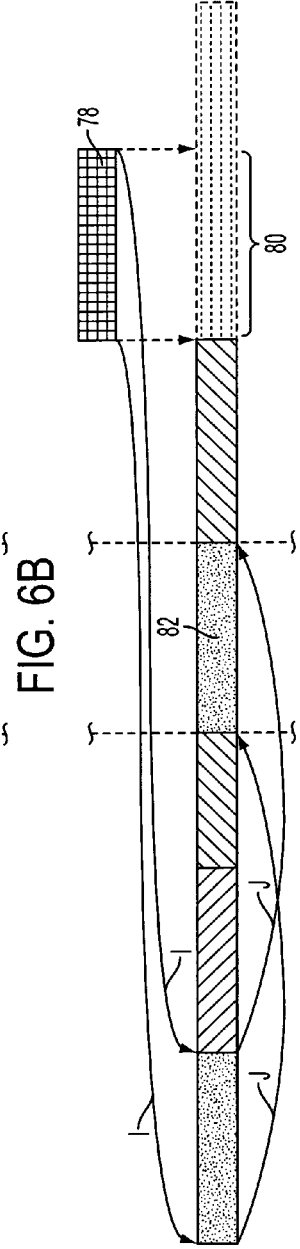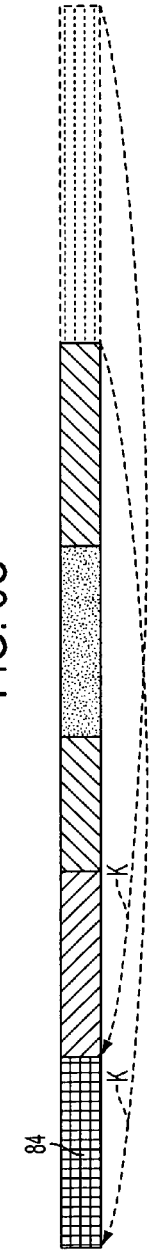

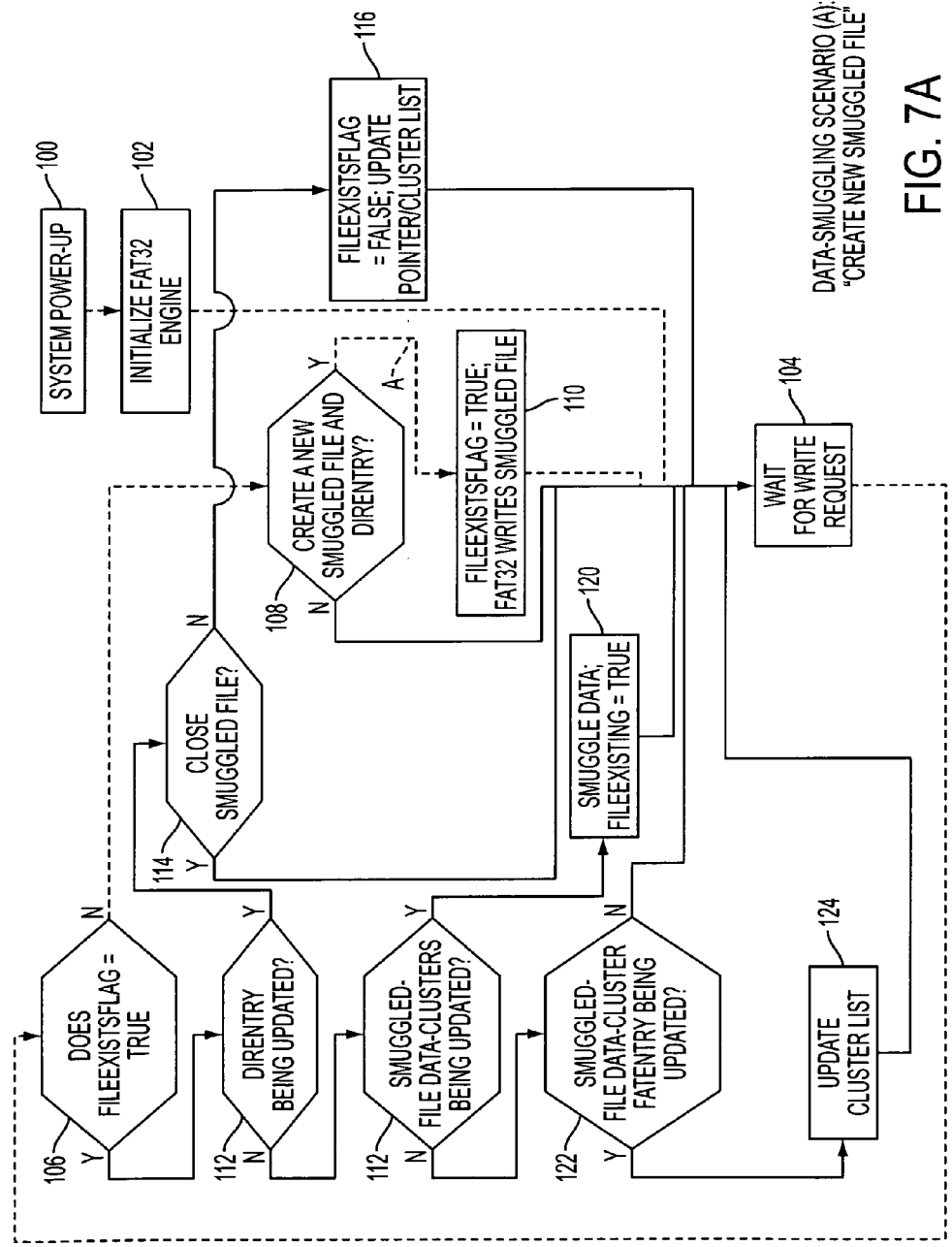

DATA-SMUGGLING SCENARIO (B): "DELETE SMUGGLED FILE"

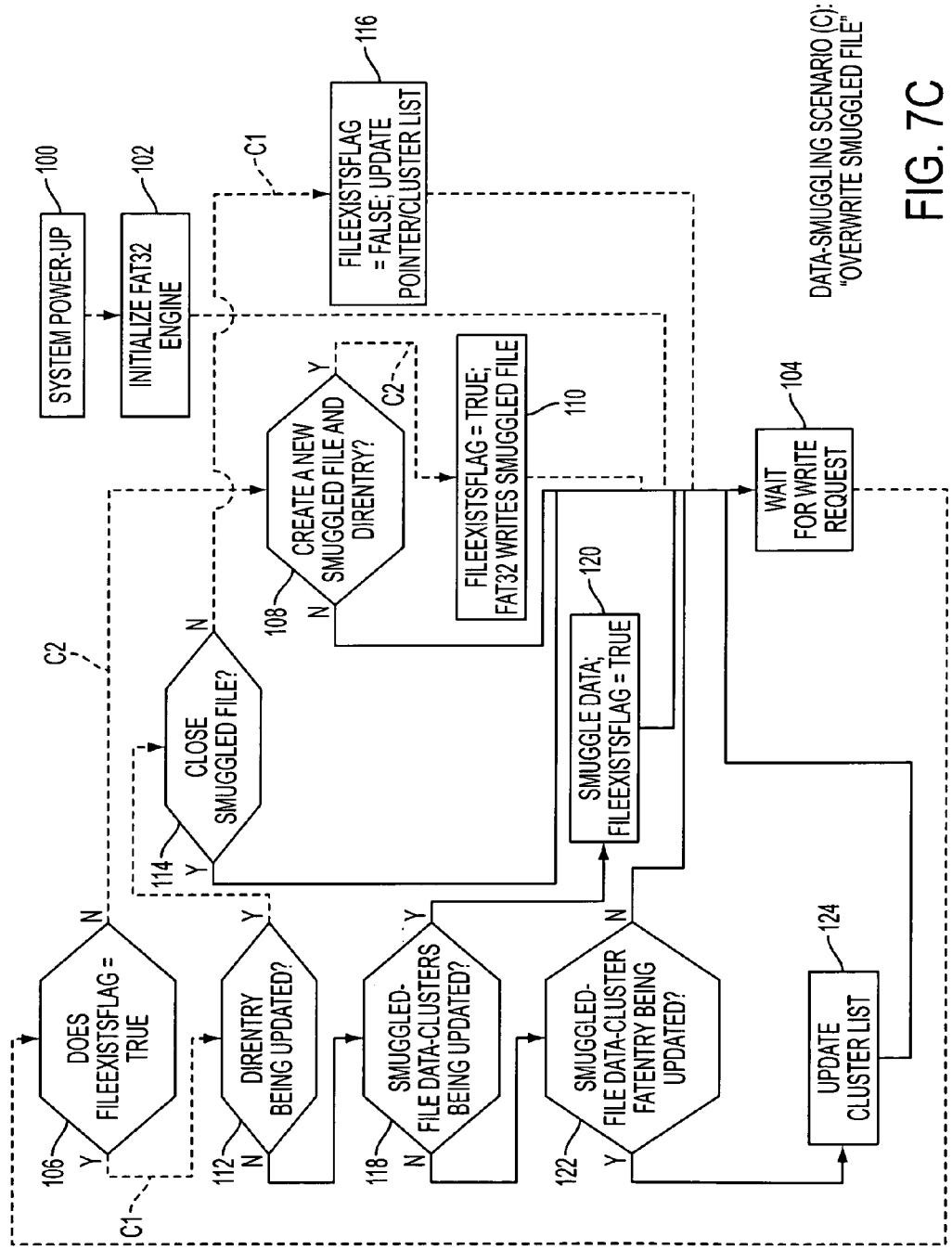

DATA-SMUGGLING SCENARIO (D): "UPDATE SMUGGLED FILE"

DATA-SMUGGLING SCENARIO (E): "APPEND TO SMUGGLED FILE"

STORAGE DEVICE FOR DATA-SMUGGLING

RELATED APPLICATIONS

This patent application is related to U.S. patent application Ser. No. 11/772,211 of the same inventor, which is entitled "METHOD FOR DATA-SMUGGLING" and filed on the same day as the present application. That patent application, also claiming priority to U.S. Provisional Application No. 60/915,688, filed May 3, 2007 is incorporated in its entirety as if fully set forth herein.

FIELD AND BACKGROUND OF THE INVENTION

The present invention relates to systems for enabling an authorized application to access data in restricted storage areas using only a file-system application-interface (FSAPI).

Non-volatile memory (NVM) storage devices that enable the operation of host systems are well-known in the art of computer engineering. Simple security considerations logically motivate developers of host systems to prevent the "boot partition" from being accessed by an ordinary file system.

Access to restricted sub-areas, such as the boot partition and system data (e.g. security keys) is restricted; these sub-areas cannot be accessed by applications using only FSAPI. Other storage sub-areas that are intended to serve applications and users are accessed by the file system using FSAPI. This restriction is typically implemented by limiting the range of addresses that are accessible to the file system, excluding the addresses of the restricted sub-areas.

However, in the course of the life of a host system, it is occasionally necessary to access data in restricted sub-areas (e.g. for updating a boot image, and for reading system keys). A need to update the boot partition can arise for a variety of reasons (e.g. to fix a software bug, or to install a newly-available feature).

Since the restricted area cannot be modified by the operating system (OS) using FSAPI, such an update is complex and requires device-specific, host-specific, and OS-specific applications that are able to bypass the restrictions and access the privileged areas.

Such solutions (e.g. UpdateXIP available from Microsoft™ Corporation) involve flagging the RAM, rebooting the host system without powering down, checking the flag by the boot code, and loading special code from the boot partition that can access the boot partition. This procedure implies that there will be a non-uniformity among the components involved (e.g. storage device, host system, and OS). Such a situation makes the update of restricted areas (e.g. boot partition) in a storage device a very costly feature.

A prior-art system, such as that disclosed by Moran, US Patent Application No. 20060031632 (hereinafter referred to as Moran '632), hereby incorporated by reference as if fully set forth herein, discloses a system for storing data without the data being directly written by the file system of the host system. However, Moran '632 discloses only an internal backup mechanism by which the storage device protects data written by the host system from being lost (by restoring it automatically upon powering up), but fails to disclose how data can be read from a different logical address than the address where the data was written. Therefore, systems according to Moran '632 cannot be useful for enabling access to data in restricted areas.

It would be desirable to have systems for enabling all authorized application to access data in restricted storage areas using only FSAPI.

SUMMARY OF THE INVENTION

It is the purpose of the present invention to provide systems for enabling an authorized application to access data in restricted storage areas using only FSAPI.

For the purpose of clarity, several terms which follow are specifically defined for use herein. The terms "file-system application-interface", "FSAPI", and "file-system API" are used herein to refer to a set of standard operations that a file system can perform on a storage device, namely: open/create file/directory; read/write file/directory; delete file/directory, rename file/directory; and close file/directory. The term "storage area" is used herein to refer to a sequential logical (not physical) address range of the storage device.

The term "FAT32" is used herein to refer to a file system defined in the Microsoft FAT32 specifications. The term "cluster" is used herein to refer to a data structure defined in the Microsoft FAT32 specifications. The term "FAT entry" is used herein to refer to a data structure defined in the Microsoft FAT32 specifications. The terms "file allocation table" and "FAT" are used herein to refer to a data structure defined in the Microsoft FAT32 specifications. The term "DirEntry" is used herein to refer to a data structure defined in the Microsoft FAT32 specifications.

The terms "last update-time field" and "LUT field" are used herein to refer to a parameter in the DirEntry, specifying the last time that a file was updated, as defined in the Microsoft FAT32 specifications. The term "file-length parameter" is used herein to refer to a parameter in the DirEntry, specifying the length of the file in bytes, as defined in the Microsoft FAT32 specifications.

The term "sector" is used herein to refer to a logical sequential address of a data packet. The data packets can be either logical sequential 512 bytes, logical-sequential FAT32 sectors, or logical sequential FAT32 clusters. The term "file" is used herein to refer to any data object that can be handled by FSAPI (e.g. a data file, a part of a data file, a directory, and a play list). The term "FAT32 sector" is used herein to refer to a sector of 512 bytes.

The term "logical partition" is used herein to refer to a logical sequential range of sectors. Logical partitions can be managed only by one host-software module at a time. Examples of host-software modules include file system and chipset boot ROM. The term "restricted area" is used herein to refer to a logical partition that should not be accessed by the host file-system but by other modules. The term "non-restricted area" is used herein to refer to a logical partition that may be accessed by the host file-system. The term "restricted sector" is used herein to refer to a sector that is in the range of the restricted area. The term "non-restricted sector" is used herein to refer to a sector that is in the range of the non-restricted area.

The term "smuggling" is used herein to refer to an internal storage operation by which the host file-system writes data into one logical address, and the storage device internally enables access to the data at a different logical address. In a special case, smuggling can be used to allow the host file-system to read and write data in restricted areas. The term "smuggled data" is used herein to refer to data on which a smuggling operation has been performed. The term "wasted sector" is used herein to refer to a logical sector that the storage device does not use for data storage due to a smuggling operation. The term "releasing space" is used herein to refer to the conversion of wasted sectors to sectors that store data.

The present invention teaches a method for accessing restricted areas in a storage device using only FSAPI. For the purpose of the description, the most problematic operation in accessing storage is addressed; that is the updating operation. Nonetheless, the present invention, as described later, also applies to opening, creating, reading, and deleting operations.

Preferred embodiments of the present invention are implemented using an indirect process that has three steps. The first step is to store the file, which is to be smuggled into a restricted area, in a non-restricted area. The file is stored with an attribute that is legitimate in FSAPI, but is recognizable by the storage device as a "smuggling indication". The second step, performed by the storage device, is to is search for a "smuggling indication" in the newly-stored file. The third step, which takes place only if a smuggling indication has been detected, is the smuggling of the file, which is performed internally by the storage device, to the designated restricted area.

Detection

In a preferred embodiment of the present invention, the smuggling indication is the name of the file. In another preferred embodiment of the present invention, the smuggling indication is special content in the body of the file (e.g. header, footer, or any other pre-defined offset in the file).

Smuggling

In a preferred embodiment of the present invention, the smuggling of the file from the non-restricted area to the restricted area is performed by physically copying the data from the non-restricted area to the restricted area. This is referred to as the "Copy" mode.

In another preferred embodiment of the present invention, the smuggling is performed by logically mapping the non-restricted area into the restricted area, so that a device, which needs to read data from the restricted area, is redirected to the non-restricted area. This is referred to as the "Map-Out" mode.

In another preferred embodiment of the present invention, the smuggling is performed by converting the logical offset of the smuggled data in the file to a corresponding offset in the restricted area, thereby mapping the non-restricted area to the restricted area for reading. When the file system attempts to read data from the smuggled file written into the non-restricted area, the storage device detects the operation as "reading smuggled data". The data will be retrieved from the corresponding location in the restricted area by matching the offset in the restricted area to the offset in the smuggled file. This is referred to as the "Map-In" mode.

In other preferred embodiments of the present invention, in either Copy, Map-Out, or Map-In mode, the smuggling is performed after the writing into the non-restricted area has been completed, and the file has been closed. In other preferred embodiments of the present invention, in either Map-Out or Map-In mode, the smuggling is performed while the file is being written.

Releasing Space

In a preferred embodiment of the present invention, the storage device reuses the logical addresses of the non-restricted areas, which have been mapped to restricted area addresses and lost, by adding a virtual sub-area beyond the capacity of the storage device, and mapping the virtual sub-area into the lost range of addresses.

In another preferred embodiment of the present invention, the application deletes the file that has just been written after waiting a reasonable period of time for the smuggling operation to take place. This procedure releases the non-restricted area for use. This is referred to as the "Copy-Delete" mode.

General

In other preferred embodiments of the present invention, the steps of detection, smuggling, and releasing space can be performed on a part of a file, as described below.

In other preferred embodiments of the present invention, the steps of detection, smuggling, and releasing space can be performed on a plurality of files in which each restricted area has its own specific pointer for indicating the destination of the smuggling to the storage device.

Therefore, according to the present invention, there is provided for the first time a computing system: (a) a host system having: (i) a file system and a block device driver for running on the host system; and (ii) at least one application for running on the host system; and (b) a storage device having: (i) a controller for controlling the storage device; and (ii) a storage area for storing information in the storage device; and (c) a first mechanism for restricting access, by the file system, to a restricted area of the storage area; and (d) a second mechanism, residing in the storage device, for enabling at least one application to access the restricted area via the file system.

Preferably, the second mechanism is configured to enable the storage device to copy data from a non-restricted area of the storage area to the restricted area.

Preferably, the second mechanism is operative to direct the storage device to route host-system read-requests, directed to addresses in the restricted area, to addresses in a non-restricted area of the storage area.

Preferably, the second mechanism is operative to apply access commands of the host system to restricted data residing in the restricted area when the host system requests access to non-restricted data addressed to a non-restricted area of the storage area.

According to the present invention, there is provided for the first time a computer-readable storage medium having computer-readable code embodied on the computer-readable storage medium, the computer-readable code including: (a) program code for restricting access, by a file system running on a host system, to a restricted area of a storage area of a storage device; and (b) program code for enabling at least one application to access the restricted area via the file system.

Preferably, the computer-readable code further includes: (c) program code for enabling the storage device to copy data from a non-restricted area of the storage area to the restricted area.

Preferably, the computer-readable code further includes: (c) program code for directing the storage device to route host-system read-requests, directed to addresses in the restricted area, to addresses in a non-restricted area of the storage area.

Preferably, the computer-readable code further includes: (c) program code for applying access commands of the host system to restricted data residing in the restricted area when the host system requests access to non-restricted data addressed to a non-restricted area of the storage area.

These and further embodiments will be apparent from the detailed description and examples that follow.

BRIEF DESCRIPTION OF THE DRAWINGS

The present invention is herein described, by way of example only, with reference to the accompanying drawings, wherein:

FIG. 3A is a simplified block diagram of a Map-In mode of smuggling data showing the logical partitions of a storage device, according to preferred embodiments of the present invention;

FIG. 3B shows the partitions of FIG. 3A after receiving a write request from FAT32 to write a data sector into a non-restricted sector;

FIG. 3C shows the partitions of FIG. 3B after the data sector has been stored internally by the storage device in a restricted sector;

FIG. 5A is a simplified block diagram of a Map-In mode of smuggling data showing the logical partitions of a storage device, according to preferred embodiments of the present invention;

FIG. 5B shows the partitions of FIG. 5A after receiving a write request from FAT32 to write a data sector into a non-restricted sector;

FIG. 5C shows the partitions of FIG. 5B after receiving a write request from FAT32 to write a data sector into a virtual sector;

FIG. 5D shows the partitions of FIG. 5C after receiving a request from FAT32 to read or a virtual sector that has been mapped by the storage device to the non-restricted sector that was already mapped into a restricted sector in FIG. 5C;

FIG. 6A is a simplified block diagram of a Map-Out mode of smuggling data showing the logical partitions of a storage device, according to preferred embodiments of the present invention;

FIG. 6B shows the partitions of FIG. 6A after receiving a write request from FAT32 to write a data sector into a non-restricted sector;

FIG. 6C shows the partitions of FIG. 6B after receiving a write request from FAT32 to write a data sector into a virtual sector;

FIG. 6D shows the partitions of FIG. 6C after receiving a read request from FAT32 to read a virtual sector;

FIG. 7A is a simplified flowchart of the data-smuggling detection-scheme, implemented in a host system having a storage device, for Scenario (A): create a new smuggled file, according to preferred embodiments of the present invention;

FIG. 7C is a simplified flowchart of the data-smuggling detection-scheme, implemented in a host system having a storage device, for Scenario (C): overwrite a smuggled file, according to preferred embodiments of the present invention;

DESCRIPTION OF THE PREFERRED EMBODIMENTS

The present invention relates to systems for enabling an authorized application to access data in restricted storage areas using only FSAPI. The principles and operation for enabling an authorized application to access data in restricted storage areas using only FSAPI, according to the present invention, may be better understood with reference to the accompanying description and the drawings.

The drawings describe the three stages of smuggling data into a storage device;

(1) pre-smuggling: detecting the beginning of a smuggling operation;

(2) smuggling: the smuggling operation itself; and (3) post-smuggling: maximizing free space on the storage device by releasing space following a smuggling operation.

For simplicity of the description, the following assumptions are made.

(1) The storage device is divided into two logical partitions: a restricted area for storing an OS image, the OS image, and a non-restricted area for storing user applications and data files.

(2) The host-system processor accesses the storage device's restricted area by executing a software code stored in the host-system processor's NVM. This software code, which is the boot ROM, is automatically executed by the host-system processor upon powering up. The host-system processor loads the OS image from the restricted area to the host-system RAM, moves to the start address in the RAM, and then executes the code. The boot ROM is limited in size, and therefore, cannot include any information regarding FAT32 metadata and data structures.

(3) The host system accesses the storage device's non-restricted area via the FAT32. The FAT32 is executed when the boot process is completed.

(4) The restricted area starts from sector 0; therefore, the OS image is stored starting from sector 0.

(5) The non-restricted area starts from sector "FAT32StartSector" that can be any sector greater than the OS-image sectors.

(6) The storage device has software or hardware logic, referred to herein as the "FAT32 engine", that recognizes the metadata and the data structures used by the FAT32, such as the location and the structure of the FAT and DIR entries.

(7) The OS image (stored in the restricted area) is updated by user-application requests, via the FAT32, to write data into the non-restricted area.

(8) The storage device stores, in a non-volatile hidden area (i.e. hidden from the host-system processor, the boot ROM, and the FAT32), a string which includes the name of a file to be smuggled (e.g. OSIMAGE.BIN), and a pointer (e.g. 4 bytes) to the start sector of the restricted area.

Figure 1:
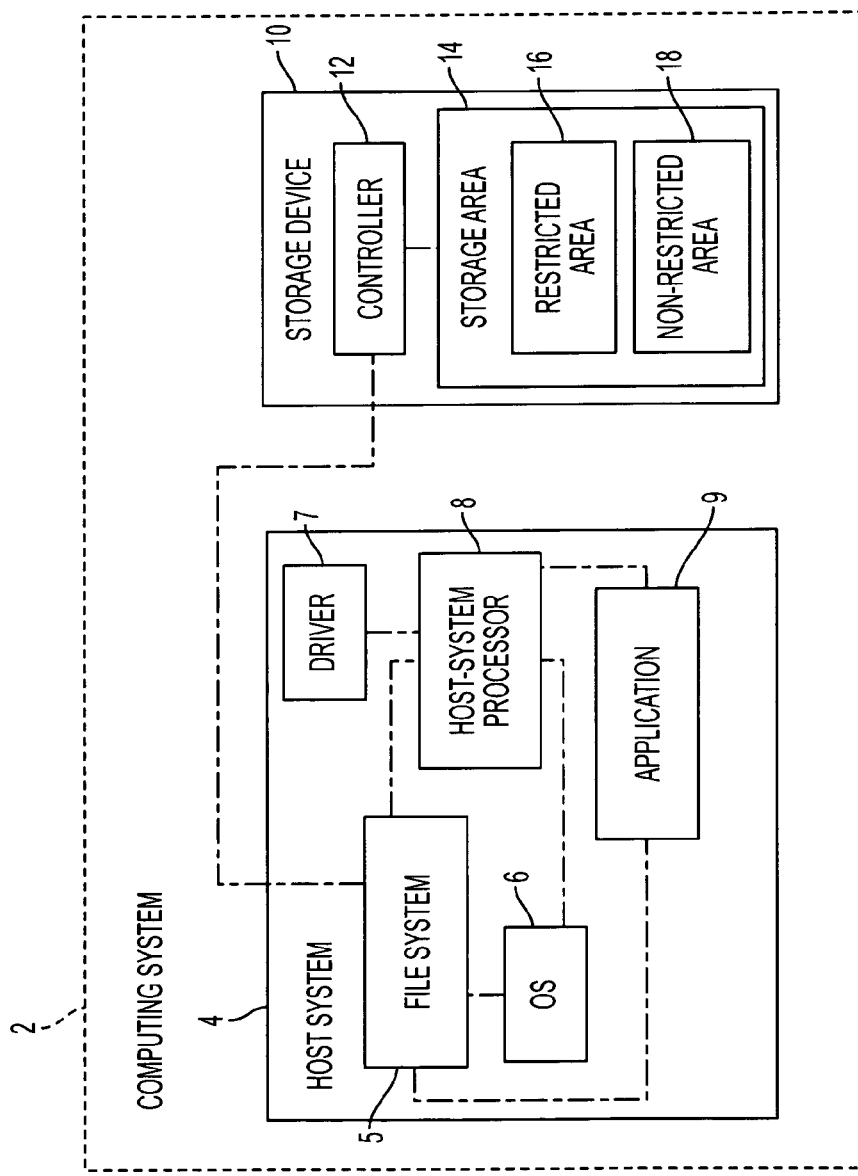
FIG. 1 is a simplified schematic block diagram of a computing system for smuggling data and releasing space of a storage device, according to preferred embodiments of the present invention.

Referring now to the drawings, FIG. 1 is a simplified schematic block diagram of a computing system for smuggling data and releasing space of a storage device, according to preferred embodiments of the present invention. A computing system 2, having a host system 4, is shown. Host system 4 includes a file system 5, an OS 6, drivers 7, a host-system processor 8, and an application 9. Drivers 7 include standard block device drivers. Host system 4 is shown operationally connected to a storage device 10 having a controller 12 and a storage area 14. Storage area 14 has a restricted area 16 and a non-restricted area 18.

FIGS. 2A-D are simplified block diagrams of a Copy-Delete mode for smuggling data and releasing space at various stages of the process, according to preferred embodiments of the present invention. FIGS. 2A-D show four stages for updating an OS image by smuggling data into a restricted area via a non-restricted area, and then releasing the non-restricted area of any intermediate data that was generated during the smuggling process.

Figure 2A:
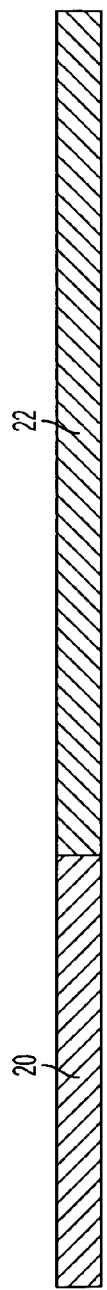
FIG. 2A is a simplified block diagram of a Copy-Delete mode for smuggling data and releasing space showing the logical partitions of a storage device, according to preferred embodiments of the present invention.

FIG. 2A is a simplified block diagram of a Copy-Delete mode for smuggling data and releasing space showing the logical partitions of a storage device, according to preferred embodiments of the present invention. The storage device has two partitions a restricted area 20 for storing the OS image, and a non-restricted area 22 for storing user data.

Figure 2B:
FIG. 2B shows the partitions of FIG. 2A after receiving a write request from FAT32 for smuggled data.

FIG. 2B shows the partitions of FIG. 2A after receiving a write request from FAT32 for smuggled data. FIG. 2B shows a smuggled file 24 (e.g. OS image). The storage device stores smuggled file 24 in non-restricted area 22. The detection process is described with regard to FIGS. 7A-E.

Figure 2C:
FIG. 2C shows the partitions of FIG. 2B after the storage device internally copies the smuggled data into the restricted area.

FIG. 2C shows the partitions of FIG. 2B after the storage device internally copies the smuggled data into the restricted area. Smuggled file 24 is shown copied into restricted area 20. Smuggled file 24 then becomes a restricted file 26 (i.e. a data file that cannot be accessed by FAT32).

Figure 2D:
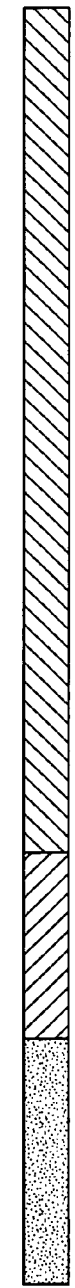
FIG. 2D shows the partitions of FIG. 2C after the smuggled data that was stored in the non-restricted area is deleted.

FIG. 2D shows the partitions of FIG. 2C after the smuggled data that was stored in the non-restricted area is deleted. The deletion of smuggled file 24 can be initiated by the application that wrote the file (after a safety delay that allows the storage device to complete the smuggling), or by the storage device itself (upon the next powering up).

In the example of smuggled file 24 being the OS image, the OS image is stored in the restricted area (as restricted file 26), and can be accessed by the host-system processor's boot ROM, but cannot be read by FAT32. The Copy-Delete mode of smuggling data and releasing space is not applicable to partial updates of an OS image, but only to cases in which the OS image is fully updated.

FIGS. 3A-C are simplified block diagrams of a Map-In mode of smuggling data at various stages of the process, according to preferred embodiments of the present invention. FIGS. 3A-C show three stages for updating an OS image by writing the data into a non-restricted area, and then smuggling the data by mapping the non-restricted area into a restricted area.

FIG. 3A is a simplified block diagram of a Map-In mode of smuggling data showing the logical partitions of a storage device, according to preferred embodiments of the present invention. As described with regard to FIG. 2A, restricted area 20 for storing the OS image, and non-restricted area 22 for storing user data.

FIG. 3B shows the partitions of FIG. 3A after receiving a write request from FAT32 to write a data sector into a non-restricted sector. A data sector 30 is shown being written into a non-restricted sector 32. If the storage device detects (according to the data-smuggling detection-scheme described with regard to FIGS. 7A-E) that FAT32 sent requests for writing data sector 30 that match the criteria of the smuggled file, then the storage device maps (Mapping A) non-restricted sector 32 to a restricted sector 34 by "translating" sector numbers of non-restricted sector 32 into restricted-area sector numbers of restricted sector 34. The "translation" is performed as follows: the storage device calculates the offset of non-restricted sector 32 in the file (described in detail with regard to FIGS. 7A-E), and the sector offset is translated to a sector offset in restricted area 20.

FIG. 3C shows the partitions of FIG. 3B after the data sector has been stored internally by the storage device in a restricted sector. Any write request from FAT32 (to non-restricted sector 32), or from the host-system's boot-ROM code (to restricted sector 34), is routed internally by the storage device to restricted sector 34. The routing mechanism is managed by the storage device, which manages a lookup table of non-restricted to restricted sectors. Every entry in the table includes a non-restricted sector number that was smuggled, and a corresponding restricted sector number that was mapped in FIG. 3B. The storage device monitors the write requests coming from FAT32, and checks in the lookup table if the non-restricted sector is requested. If the non-restricted sector is requested, then the storage device routes (Mapping B) the write request for the data sector, which is expected to be located in a sector 36, to be actually written in a sector 38. This process is referred to as the Map-In mode, since the process maps sectors in the range of a non-restricted area into sectors in the range of a restricted area.

The Map-In mode is mostly applicable to cases in which the host-system processor requires fast response from the storage device, and thus, is not tolerant of the "preparations" required by the FAT32 engine of the storage device in order to build the lookup table. The preparations required by the FAT32 engine are described with regard to FIGS. 7A-E. The Map-In mode internally routes the FAT32 requests (executed by the host-system processor) to restricted sectors according to the lookup table without indication to FAT32. Thus, the non-restricted sectors that appear in the lookup table are not used by the storage device for storing data. A method for such wasted sectors to be reused by FAT32 is described with regard to FIGS. 5A-D.

Figure 4A:
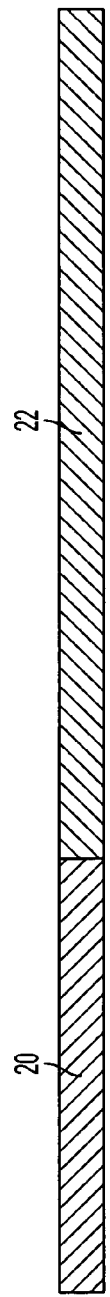
FIG. 4A is a simplified block diagram of a Map-Out mode of smuggling data showing the logical partitions of a storage device, according to preferred embodiments of the present invention.
Figure 4B:
FIG. 4B shows the partitions of FIG. 4A after receiving a write request from FAT32 to write a data sector into a non-restricted sector.
Figure 4C:
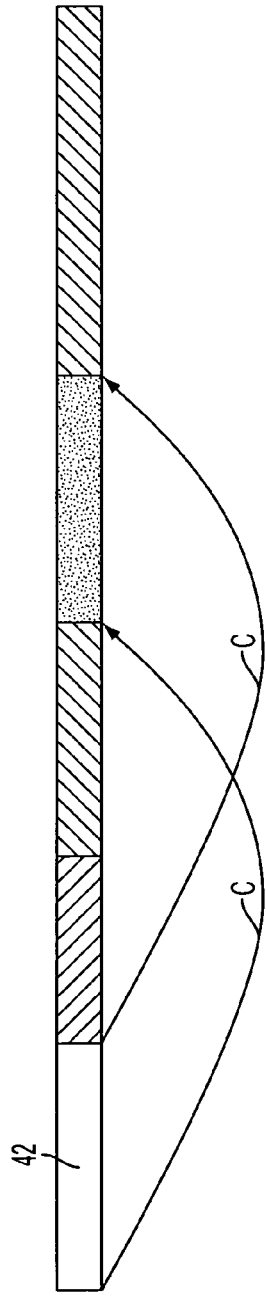
FIG. 4C shows the partitions of FIG. 4B after a restricted sector has been mapped by the storage device to the non-restricted sector that was written in FIG. 4B.

FIGS. 4A-C are simplified block diagrams of a Map-Out mode of smuggling data at various stages of the process, according to preferred embodiments of the present invention. FIGS. 4A-C show three stages for updating an OS image by smuggling data directly into a non-restricted sector, and then mapping out a restricted sector into the non-restricted sector.

FIG. 4A is a simplified block diagram of a Map-Out mode of smuggling data showing the logical partitions of a storage device, according to preferred embodiments of the present invention. Restricted area 20 and non-restricted area 22 are shown (as described with regard to FIGS. 2A and 2A).

FIG. 4B shows the partitions of FIG. 4A after receiving a write request from FAT32 to write a data sector into a non-restricted sector. The storage device stores the data in a non-restricted sector 40 as requested by FAT32.

FIG. 4C shows the partitions of FIG. 4B after a restricted sector has been mapped by the storage device to the non-restricted sector that was written in FIG. 4B. A data sector 42 is internally mapped (Mapping C), according to the lookup table described with regard to FIG. 3C, by the storage device into non-restricted sector 40. Thus, upon any access request (coming from host-system processor boot ROM to the OS image that is stored in the restricted area), the storage device internally routes the access request to non-restricted sector according to the lookup table above.

The Map-Out mode maps sectors in the range of a restricted area into sectors in the range of a non-restricted area. Such mappings create a situation in which the restricted sectors that appear in the lookup table are not used by the storage device for storing OS-image data. A method for such wasted sectors to be reused by FAT32 is described with regard to FIGS. 6A-D. The Map-Out mode is mostly applicable to cases in which the host-system processor does not require fast response from the storage device, and thus, is not tolerant of the preparations required by the FAT32 engine of the storage device in order to build the lookup table.

FIGS. 5A-D are simplified block diagrams of releasing space in the Map-In mode of smuggling data at various stages of the process, according to preferred embodiments of the present invention. FIGS. 5A-D show four stages for utilizing wasted sectors created during the Map-In process.

FIG. 5A is a simplified block diagram of a Map-In mode of smuggling data showing the logical partitions of a storage device, according to preferred embodiments of the present invention. A restricted area 50 for storing the OS image, a non-restricted area 52 for storing user data, and a virtual area 54 are shown. In contrast to FIGS. 2A, 2A, and 3A, the storage device presents to the host system virtual area 54 having the size of restricted area 50. Virtual area 54 is a logical sequential range of sectors. The storage device presents, to FAT32 of the host system, an area having sectors for non-restricted area 52 and sectors for virtual area 54. As a result, when FAT32 is executed on host-system processor, FAT32 manages non-restricted area 52 and virtual area 54 as one non-restricted area.

FIG. 5B shows the partitions of FIG. 5A after receiving a write request from FAT32 to write a data sector into a non-restricted sector. A data sector 56 is shown being written into a non-restricted sector 58. If the storage device detects (according to the data-smuggling detection-scheme described with regard to FIGS. 7A-E) that FAT32 sent requests for writing data sector 56 that match the criteria of the smuggled file, then the storage device checks the lookup table, and gets the sector number for a restricted sector 60 for writing the smuggled data. The storage device routes (Mapping D) data sector 56 to be stored into restricted sector 60.

FIG. 5C shows the partitions of FIG. 5B after receiving a write request from FAT32 to write a data sector into a virtual sector. Smuggled data 62, stored in restricted area 50, is shown receiving a request to write a data sector 64 into a virtual sector 66 in the range of virtual area 54 from FAT32 executed on the host-system processor. The storage device, in addition to the lookup table mentioned with regard to FIG. 3C, manages a "virtual-to-logical" (VTL) lookup table. Every entry in the VTL table includes a virtual sector number and a corresponding non-restricted sector number. When FAT32 tries to write data sector 64 to a virtual data sector 66 (a sector in the range of virtual area 54), the storage device internally checks the VTL lookup table to determine if virtual sector 66 has already been mapped to a non-restricted sector.

If virtual sector 66 has been mapped (as described with regard to data sector 56 of FIG. 5B), the storage device internally routes (Mapping IS) the FAT32 request to a matching non-restricted sector 68. If virtual sector 66 has not been mapped yet, the storage device goes checks the non-restricted sector-numbers in the VTL lookup table to see whether a virtual sector is mapped to a non-restricted sector. If the storage device finds a non-restricted sector to which no virtual sector is mapped (i.e. a wasted sector), the storage device maps (Mapping E) virtual sector 66 to non-restricted sector 68 (the available "wasted sector), and updates the corresponding entry in the VTL lookup table with the non-restricted sector-number. The storage device then internally stores data sector 64 (sent by FAT32 to virtual sector 66) into sector 68.

The storage device updates the lookup table with the mapped sector-number of restricted sector 62 (as described with regard to FIG. 3C). When FAT32 tries to access (i.e. read or write) non-restricted sector 68 (as shown in FIG. 5C), the storage device internally routes (Mapping F) the request to restricted sector 62 (in restricted area 50).

If the storage device cannot find any available non-restricted sector (that is not mapped into a restricted sector) because the wasted area is smaller than restricted area 50 (which, in turn, is a result of smuggling an area that is smaller than all of restricted area 50), then the storage device uses the available storage area in restricted area 50 to store data sectors that are sent by FAT32 to a virtual address. These data sectors are then mapped directly from virtual area 54 into restricted area 50. As soon as more data is smuggled into restricted area 50, and more wasted area is created in non-restricted area 52, the storage device moves these "directly-mapped" data sectors from restricted area 50 to non-restricted area 52, making restricted area 50 available for the newly-smuggled data.

FIG. 5D shows the partitions of FIG. 5C after receiving a request from FAT32 to read or a virtual sector that has been mapped by the storage device to the non-restricted sector that was already mapped into a restricted sector in FIG. 5C. In FIG. 5D, FAT32 tries to read or write virtual sector 66, which has already been mapped into a non-restricted logical sector 70 (which, in turn, has already been mapped into restricted sector 62), from the storage device. The storage device checks the VTL lookup table for mapped non-restricted logical sector 70, and routes (Mapping G) the FAT32 request to non-restricted logical sector 70. Thus:

(1) data intended for non-restricted area 52 is stored in non-restricted area 52;

(2) smuggled data intended for non-restricted area 52 is stored in restricted area 50 (as intended by the data-smuggling scheme); and (3) data intended for virtual area 54 is stored in non-restricted area 52.

FIGS. 6A-D are simplified block diagrams of releasing space in the Map-Out mode of smuggling data at various stages of the process, according to preferred embodiments of the present invention. FIGS. 6A-D show four stages for utilizing wasted sectors created during the Map-Out process.

FIG. 6A is a simplified block diagram of a Map-Out mode of smuggling data showing the logical partitions of a storage device, according to preferred embodiments of the present invention. Restricted area 50, non-restricted area 52, and virtual area 54 are shown (as described with regard to FIG. 5A).

FIG. 6B shows the partitions of FIG. 6A after receiving a write request from FAT32 to write a data sector into a non-restricted sector. A data sector 72 is shown being written into a non-restricted sector 74. If the storage device detects (according to the data-smuggling detection-scheme described with regard to FIGS. 7A-E) that FAT32 sent requests for writing data sector 72 that match the criteria of the smuggled file, then the storage device checks the lookup table (described with regard to FIG. 3C), and gets the sector number for a restricted sector 76.

The storage device internally stores data sector 72 into non-restricted sector 74. The storage device updates the lookup table with the sector number of mapped non-restricted sector 74. When, upon the next boot operation, the host-system processor tries to read the OS image from restricted sector 76 in restricted area 50, the storage device internally routes (Mapping H) the request to data sector 74 in non-restricted area 52 instead of to the restricted sector 76.

FIG. 6C shows the partitions of FIG. 6B after receiving a write request from FAT32 to write a data sector into a virtual sector. A data sector 78 is shown being written into virtual sector 80 by FAT32 executed on host processor. The storage device translates an address of virtual area 54 into an address of restricted area 50 by applying a fixed offset. When FAT32 tries to write data to virtual sector 80 (a sector in the range of virtual area 54), the storage device internally offsets (Mapping I) the address from virtual area 54 into restricted area 50, and stores data sector 78 in restricted area 50. It should be noted that the data that is intended for restricted area 50 is actually stored in non-restricted area 52, and the storage device retrieves (Mapping J) the data from a mapped non-restricted sector 82 in non-restricted area 52. Thus:

(1) data intended for non-restricted area 52 is stored in non-restricted area 52;
(2) smuggled data intended for restricted area 50 is also stored in non-restricted area 52; and
(3) data intended for virtual area 54 is stored in restricted area 50.

FIG. 6D shows the partitions of FIG. 6C after receiving a read request from FAT32 to read a virtual sector. When the storage device receives a read request from FAT32 to read virtual sector 80, the storage device applies the fixed offset (Mapping K), and reads a data sector 84 from restricted area 50.

FIGS. 7A-E are simplified flowcharts of the data-smuggling detection-scheme, implemented in a host system having a storage device, for the various data-smuggling scenarios listed below, according to preferred embodiments of the present invention. FIGS. 7A-E show five data-smuggling scenarios for a smuggled file, covering all the ordinary update operations that FAT32 might need to perform on any file in the storage device. The data-smuggling scenarios are:

(A) create a new smuggled file (when a file is created for the first time or after deletion of a file);
(B) delete a smuggled file (when a smuggled file needs to be deleted);
(C) overwrite a smuggled file (when a new smuggled file needs to replace an old smuggled file by deleting the old smuggled file, and creating the new smuggled file);
(D) update a smuggled file in place (when an existing smuggled file needs to be partially updated); and
(E) append to a smuggled file (when an existing smuggled file needs to be extended).

The data-smuggling detection-scheme makes use of monitoring any write request coming from FAT32 to the storage device, and identifying whether the request is for the FAT, directory entry FAT32 sector, or data cluster.

Data that is intended to update a file by smuggling the file is identified by detection of a pre-defined string that is stored in NVM. The pre-defined string, hereinafter referred to as the "smuggled-file identifier", is known to the application that needs to smuggle the data. The smuggled-file identifier is the full path and file name of the smuggled file. The smuggled-file identifier is sent by the application, via FAT32, as a part of the smuggled-file directory-entry data.

In all the data-smuggling scenarios listed above, when the system is powered-up (Step 100), the storage device initializes the FAT32 engine as follows (Step 102):

(1) the storage device mounts the FAT32 engine;
(2) the storage device loads the pre-defined smuggled-file identifier;
(3) the storage device sets a pointer, hereinafter referred to as "smuggled-file DirEntry pointer", that points to smuggled DirEntry address (DirEntry sector and offset within the FAT32 sector) to NULL;
(4) the storage device sets flag, hereinafter referred to as "FileExistsFlag", which is a binary parameter having the values "TRUE" or "FALSE", as follows:
  (i) the storage device checks whether a file with the filename of the smuggled-file identifier exists (looks for a DirEntry of the file in NVM);
  (ii) if the smuggled file exists, then the storage device sets FileExistsFlag to TRUE, and updates the smuggled-file DirEntry pointer; and
  (iii) if a file with the filename of the smuggled-file identifier does not exist, then the storage device sets FileExistsFlag to FALSE, and updates the smuggled-file DirEntry pointer to the last FAT32 sector of the DirEntries in the directory where the smuggled file is supposed to be stored;
(5) if FileExistsFlag is TRUE, the storage device reads the smuggled-file DirEntry, and extracts from the DirEntry the first smuggled-file data-cluster number; and
(6) the storage device reads the entire FAT chain from FAT, and then reconstructs the smuggled-file data-cluster numbers by following the linked list.

After this stage (Step 102), the storage device then waits for a write request from FAT32 (Step 104). When the storage device receives a write request from FAT32, the storage device checks whether the FileExistsFlag is TRUE or FALSE (Step 106). At this point, the individual data-smuggling scenarios follow different flows in FIGS. 7A-E that are described below.

FIG. 7A is a simplified flowchart of the data-smuggling detection-scheme, implemented in a host system having a storage device, for Scenario (A): create a new smuggled file, according to preferred embodiments of the present invention. A Flow A (represented by a dotted line) in FIG. 7A depicts the procedural path for creating a new smuggled file. When the smuggled file does not exist and FAT32 attempts to write a new smuggled file, Flow A performs the following steps.

After system power-up (Step 100), the storage device performs its internal initialization, and sets the FileExistsFlag to FALSE, and the smuggled-file DirEntry Pointer to point at the last cluster of DirEntries of the directory where the new smuggled file is supposed to be stored (Step 102). The storage device then waits for the write request (Step 104), and checks the FileExistsFlag (Step 106). Since the file does not exist at this point in Scenario (A), FileExistsFlag is FALSE, and the storage device checks whether the conditions below are valid (Step 108).

(1) Is the new DirEntry written to the same address as specified in the smuggled-file DirEntry pointer? (At this point of Scenario (A), the smuggled-file DirEntry pointer points to the last cluster of DirEntries of the directory where the smuggled file is supposed to be stored.)
(2) Is the filename specified in the DirEntry the same as the name of the smuggled file (as specified in the smuggled-file identifier)?

If both conditions are met, meaning that the storage device finds that the new smuggled-file DirEntry is being written, the storage device sets the FileExistsFlag to TRUE, and waits for FAT32 to write the smuggled file clusters, FAT entries, and data clusters (Step 110). Or, if the file happens to be empty (i.e. length=0), the storage device closes the file by updating the new DirEntry as described below with regard to FIG. 7B. If either of the two conditions are not met, meaning that a new smuggled file is not being created, the storage device waits for a new write request (Step 104).

Figure 7B:
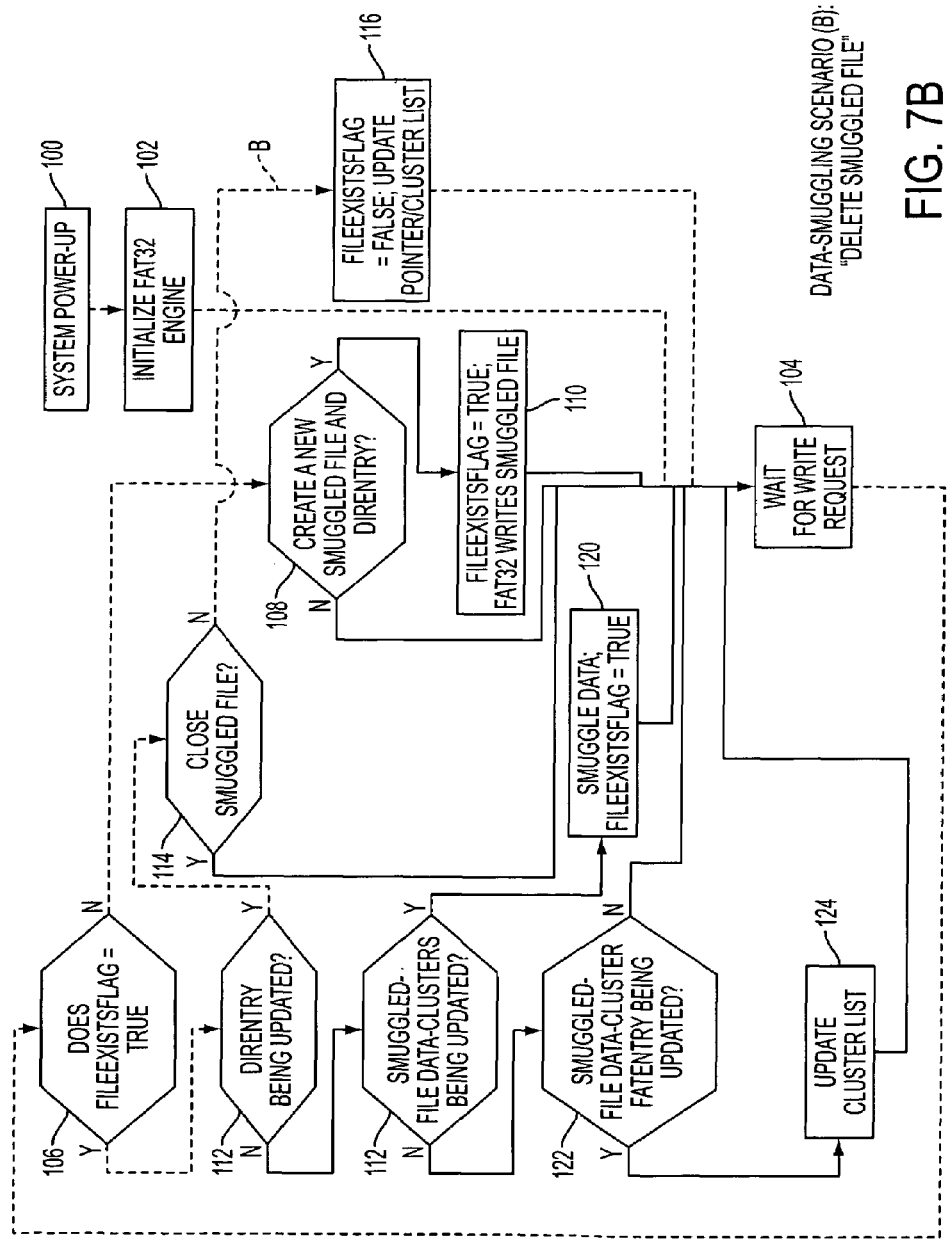
FIG. 7B is a simplified flowchart of the data-smuggling detection-scheme, implemented in a host system having a storage device, for Scenario (B): delete a smuggled file, according to preferred embodiments of the present invention.

FIG. 7B is a simplified flowchart of the data-smuggling detection-scheme, implemented in a host system having a storage device, for Scenario (B): delete a smuggled file, according to preferred embodiments of the present invention. A Flow B in FIG. 7B depicts the procedural path for deleting a smuggled file. When a new write request comes from FAT32 (Step 104), the storage device checks the FileExistsFlag (Step 106). If FileExistsFlag is TRUE, the storage device checks whether the new DirEntry is being updated or not (i.e. verifies if the currently-written FAT32 sector is the same as the smuggled-file DirEntry pointer) (Step 112).

If the smuggled-file DirEntry is being updated by FAT32 (Step 112), the storage device checks if the write request to the DirEntry is a "close" operation (by checking the LUT field and the file-length parameter in the DirEntry which are updated in this case) (Step 114). If the write request is a close operation, the storage device waits for the next "update operations" (i.e. write requests) from FAT32 (Step 104).

If the write request to the DirEntry is not a "close" operation (Step 114), meaning that the storage device detects that the write request to the smuggled-file DirEntry is a "delete" operation by writing a "delete flag" to the smuggled-file DirEntry, the storage device sets the FileExistsFlag to FALSE, updates the smuggled-file DirEntry pointer, cleans the smuggled-file cluster-numbers in the linked list (so that no data cluster belongs to the smuggled file) (Step 116), and waits for the next write operation from FAT32 (Step 104).

FIG. 7C is a simplified flowchart of the data-smuggling detection-scheme, implemented in a host system having a storage device, for Scenario (C): overwrite a smuggled file, according to preferred embodiments of the present invention. The flow for overwriting a smuggled file is a combination of Flow B of FIG. 713 for deleting a smuggled file, followed by Flow A of FIG. 7A for creating a new smuggled file. The procedural path for overwriting a smuggled file is depicted in FIG. 7C as a Flow C1, related to Flow B of FIG. 7B (i.e. the sequence of Steps 100, 102, 104, 106, 112, 114, 116, and 104), followed by a Flow C2, related to Flow A of FIG. 7A (i.e. the sequence of Steps 104, 106, 108, 110, and 104).

Figure 7D:
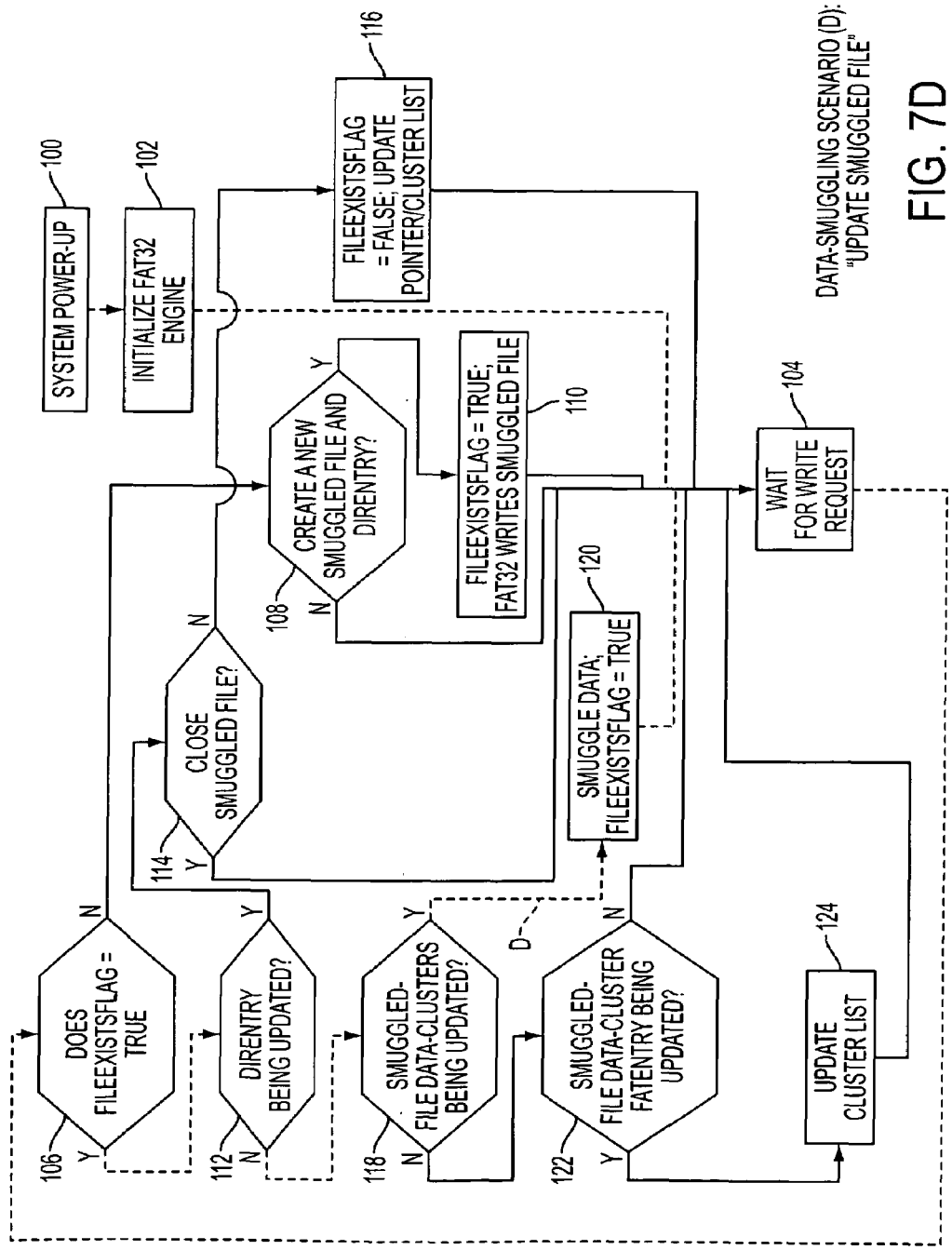
FIG. 7D is a simplified flowchart of the data-smuggling detection-scheme, implemented in a host system having a storage device, for Scenario (D): update a smuggled file, according to preferred embodiments of the present invention.

FIG. 7D is a simplified flowchart of the data-smuggling detection-scheme, implemented in a host system having a storage device, for Scenario (D): update a smuggled file, according to preferred embodiments of the present invention. A Flow D in FIG. 7D depicts the procedural path for updating a smuggled file in place. If the smuggled-file DirEntry is not being updated (Step 112), the storage device checks whether the current write request is updating one of the smuggled-file data-clusters by checking if the write request refers to one of the smuggled-file cluster-numbers in the linked list (Step 118). If the storage device finds that one of smuggled-file data-clusters is being updated, then the storage device smuggles the data clusters (using the Map-In or Map-Out smuggling mode described in FIGS. 3 and 3), and sets the FileExistsFlag (Step 120), and then waits for the next write request (Step 104). It is noted that in Scenario (B) (Step 106 of FIG. 7B) the FileExistsFlag can be detected as TRUE due to being set in Scenario (D) (Step 120 of FIG. 7D).

Figure 7E:
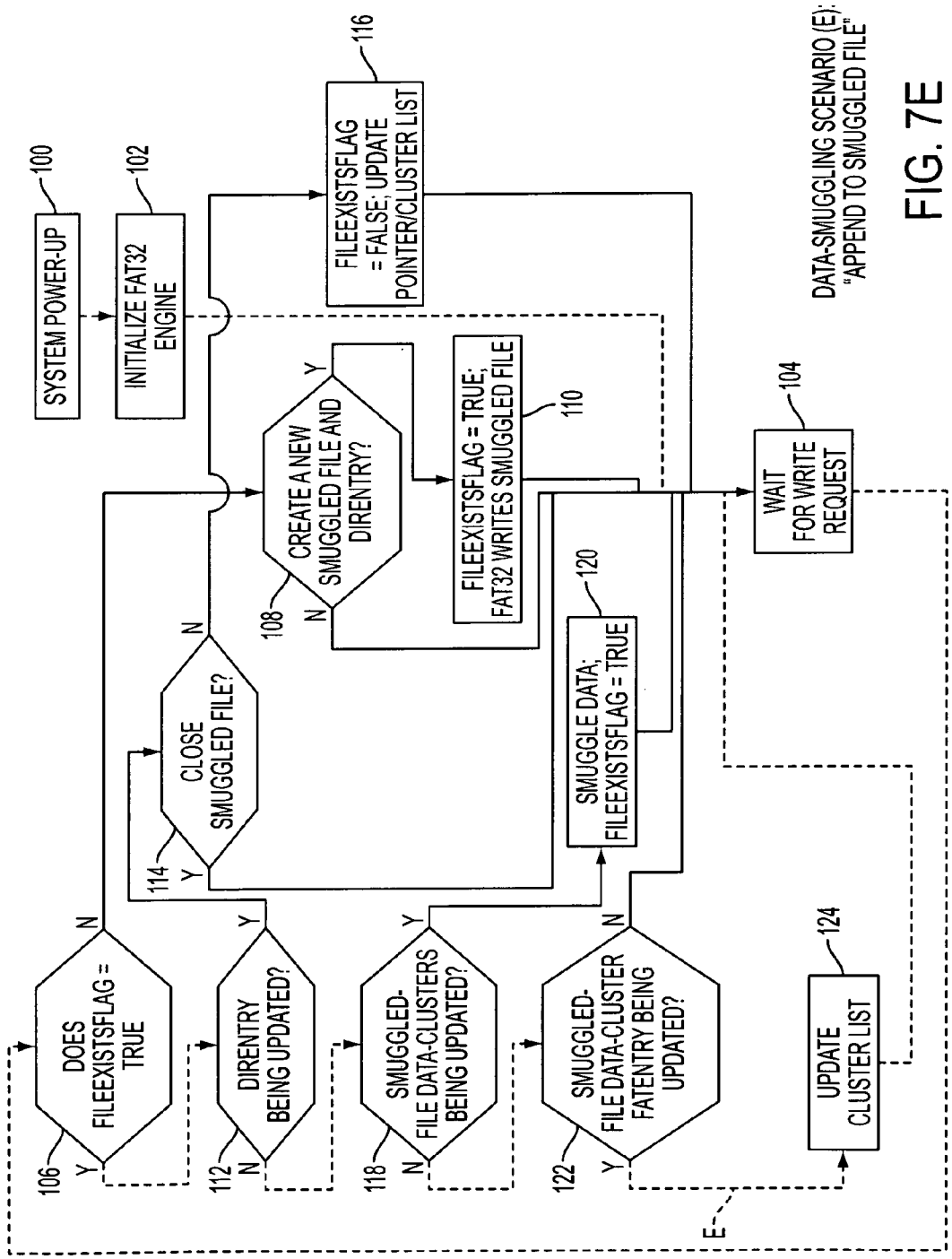
FIG. 7E is a simplified flowchart of the data-smuggling detection-scheme, implemented in a host system having a storage device, for Scenario (E): append to a smuggled file, according to preferred embodiments of the present invention.

FIG. 7E is a simplified flowchart of the data-smuggling detection-scheme, implemented in a host system having a storage device, for Scenario (E): append to a smuggled file, according to preferred embodiments of the present invention. A Flow E in FIG. 7E depicts the procedural path for appending to a smuggled file. If the write request is not updating one of the smuggled-file data-clusters (Step 118), then the storage device checks if at least one of the FAT entries that are being updated refers to the smuggled-file data-clusters in the FAT by checking if the write request refers to one of the smuggled-file cluster-numbers in the linked list (Step 122). If one or more of the smuggled-file data-cluster FAT entries in the FAT are being updated, the storage device updates the smuggled-file cluster-numbers in the linked list with the new or deleted cluster numbers (Step 124), and then waits for the next write request from FAT32 (Step 104).

Eventually, after FAT32 updates the smuggled-file data-clusters and/or the data-cluster FAT entries in the FAT, FAT32 will have to close the file by updating the LUT field and possibly file-length field in the smuggled-file DirEntry as described above.

In a scenario where the smuggled file already exists (i.e. the FileExistsFlag is set to TRUE), the storage device waits for the write requests from FAT32 (Step 104), and expects one of the following scenarios to happen:

Scenario (B): FAT32 attempts to delete the smuggled file. In this scenario, after performing the sequence of Steps 100 and 102, the storage device performs the sequence of Steps 104, 106, 112, 114, and 116 (described above);

Scenario (D): FAT32 attempts to update the smuggled file in place. In this scenario, after performing the sequence of Steps 100 and 102, the storage device performs the sequence of Steps 104, 106, 112, 118, and 120 (described above) several times. The number of iterations that the storage device performs these steps depends on the number of updates coming from FAT32; or Scenario (E): FAT32 attempts to append additional data to the smuggled file. In this scenario, after performing the sequence of Steps 100 and 102, the storage device performs the sequence of Steps 104, 106, 112, 118, 122, and 124 (described above) several times due to allocation of the new data-cluster FAT entries. The number of iterations that the storage device performs depends on the number of data-cluster FAT entries being updated. The storage device also performs the sequence of Steps 104, 106, 112, 118, and 120 (Scenario (D)) several times due to the newly-allocated data-cluster updates. The number of iterations that the storage device performs depends on the number of data-cluster updates.

While the invention has been described with respect to a limited number of embodiments, it will be appreciated that many variations, modifications, and other applications of the invention may be made.

What is claimed is:

1. A computing system comprising:
   (a) a host system having:
      (i) a file system and a block device driver for running on said host system; and
      (ii) at least one application for running on said host system; and
   (b) a storage device having:
      (i) a controller for controlling said storage device; and
      (ii) a storage area for storing information in said storage device;
      and including a restricted portion and a non-restricted portion;
   (c) a first mechanism for permitting access to said storage device, by said file system, via only said non-restricted portion; and
   (d) a second mechanism, residing in said storage device, for enabling said at least one application to access said restricted portion via said file system and said non-restricted portion.

2. The computing system of claim 1, wherein said second mechanism is configured to enable said storage device to copy data from said non-restricted portion to said restricted portion.

3. The computing system of claim 1, wherein said second mechanism is operative to direct said storage device to route host-system read-requests, directed to addresses in said restricted portion, to addresses in said non-restricted portion.

4. The computing system of claim 1, wherein said second mechanism is operative to apply access commands of said host system to data residing in said restricted portion when a data access request by said host system is addressed to said non-restricted portion.

5. A computer-readable storage medium having computer-readable code embodied on the computer-readable storage medium, the computer-readable code for managing a storage device, that includes a storage area having a restricted storage portion and a non-restricted storage portion, and that is operationally coupled to a host system having a file system whose access to the storage area of the storage device is limited to the non-restricted portion, the computer-readable code comprising program code for enabling an application running on the host system to access the restricted portion via the file system and the non-restricted portion.

6. The storage medium of claim 5, wherein said access to the restricted portion by said application is enabled by steps including having said storage device copy data from the non-restricted portion to the restricted portion.

7. The storage medium of claim 5, wherein said access to the restricted portion by said application is enabled by steps including routing host-system read-requests, directed to addresses in the restricted portion, to addresses in the non-restricted portion.

8. The storage medium of claim 5, wherein said access to the restricted portion by said application is enabled by steps including: when the host system requests access to a data address in the non-restricted portion, applying access commands of the host system to data residing in the restricted portion.

9. A storage device, for storing data accessed by a host system using a file system, the storage device comprising:
   (a) a storage area including a restricted portion and a non-restricted portion, access to the storage device by the host system via the file system being permitted via only said non-restricted portion; and
   (b) a controller operative to enable an application running on the host system to access said restricted portion via the file system and said non-restricted portion.

* * * * *